UNITED STATES PATENT OFFICE.

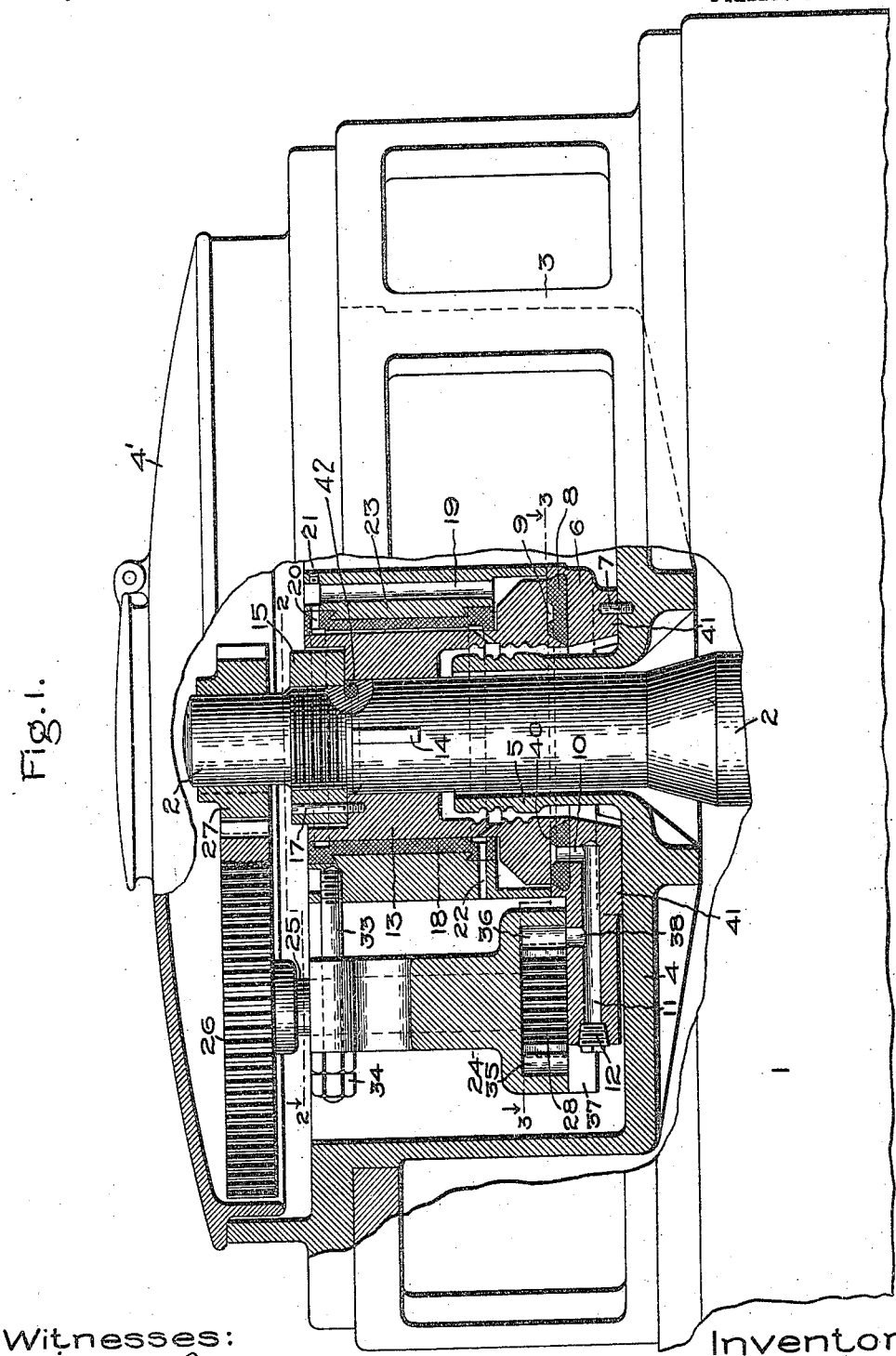

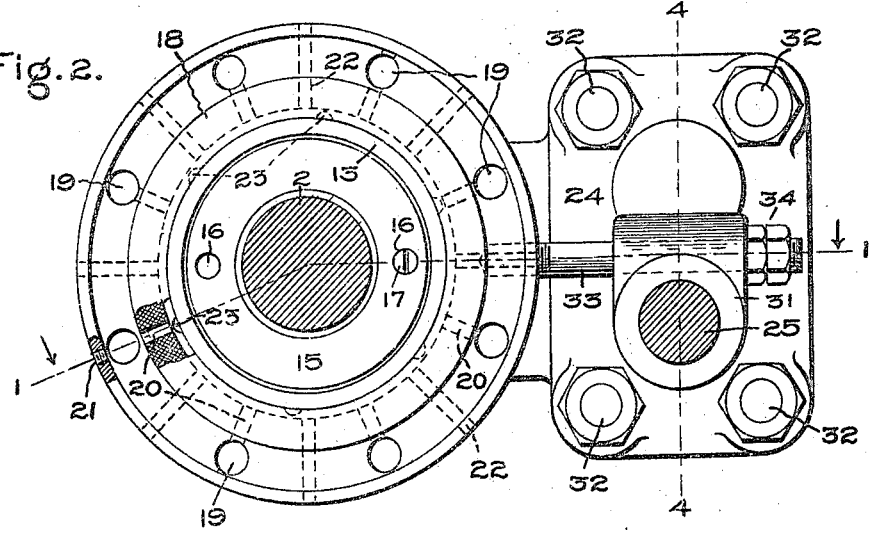
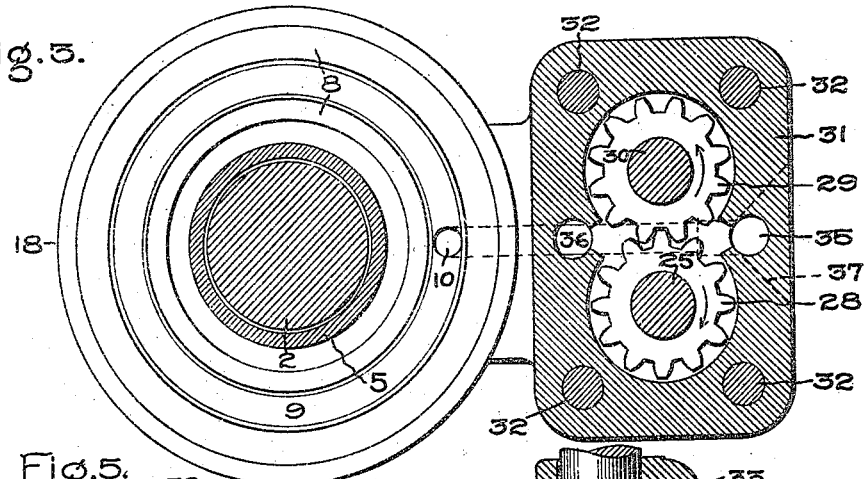
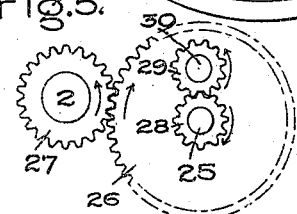
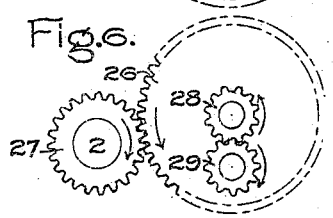

HENRY G. REIST, OF SCHENECTADY, NEW YORK, ASSIGNOR TO GENERAL ELECTRIC COMPANY, A CORPORATION OF NEW YORK.

FLUID-PRESSURE THRUST-BEARING.

949,989. Specification of Letters Patent. Patented Feb. 22, 1910.

Application filed January 16, 1908. Serial No. 411,093.

*To all whom it may concern:*

Be it known that I, HENRY G. REIST, a citizen of the United States, residing at Schenectady, county of Schenectady, State of New York, have invented certain new and useful Improvements in Fluid-Pressure Thrust-Bearings, of which the following is a specification.

My invention relates to a fluid pressure thrust bearing, and more particularly to a bearing in which the pressure producing means is operatively connected to the shaft, and has for its object a simple and cheap construction.

The various forms of novelty which characterize my invention are pointed out with particularity in the claims annexed to and forming a part of this specification.

For a better understanding of my invention, however, and the advantages possessed by it, reference may be had to the accompanying drawing, in which—

Figure 1 is a view of a dynamo-electric machine embodying my invention and is, in part, a section on the line 1—1 of Fig. 2 looking in the direction of the arrows; Fig. 2 is a section on the line 2—2 of Fig. 1; Fig. 3 is a section on the line 3—3 of Fig. 1; Fig. 4 is a section on the line 4—4 of Fig. 2; Fig. 5 shows the arrangement of gears for driving the pressure producing means, or oil pump, when the rotation is in one direction; and Fig. 6 shows the arrangement of gears for the opposite direction of rotation.

In the drawings, 1 represents a machine having a vertical shaft 2. The machine may assume any preferred form, but I have chosen to illustrate the same as a dynamo-electric machine and particularly as an induction motor. The bearing bracket 3 is supported on the frame of the motor, and in turn supports the bearing housing 4. The housing has a cover 4'. The housing has a cylindrical projecting portion 5 which fits loosely around the shaft 2. The plate 6 has a round opening therein, which allows the cylindrical portion 5 of the housing to extend through this plate. This plate 6 rests on the housing and is fastened thereto by dowel pins, one of which is shown at 7. The portion 8 of the plate 6 is babbitted, the babbitt having a circular groove 9 which connects by means of a vertical channel 10 with a horizontal channel 11. The ends of this horizontal channel are closed, the outside end being closed by a plug 12. The sleeve 13 is fastened to the shaft by a key 14 and is supported on the babbitted surface of the plate 6. A circular nut 15 is screwed upon the shaft and takes the upward pressure of the sleeve 13, the weight of the armature being transmitted from the nut 15 to the sleeve 13, and thence to the plate 6. Two holes 16 are provided in the nut 15 into which a wrench fits for tightening said nut. A screw 17 is inserted in one of the holes and screwed into the sleeve thereby insuring against the loosening of the nut. The bearing 18 surrounds the sleeve, and its inner surface, which is in frictional engagement with the sleeve, is babbitted. This bearing rests on the plate 6 and is centered by means of vertical ribs in the housing (not shown). The bearing has vertical holes 19 therein, equally spaced apart. Holes 20 connect these vertical holes or risers 19 with the babbitted surface of the bearing. The exterior ends of these holes 20 are closed by means of plugs 21. There are horizontal holes 22 parallel with the holes 20 connecting the lower part of the babbitted surface with the outside of the bearing. These holes 22 do not communicate with the vertical risers 19. The babbitted surface of the bearing 18 has vertical grooves 23 which extend from the plane of the upper holes 20 to that of the lower holes 22.

The pressure producing means consists of a gear pump 24 contained within the bearing housing 4, supported upon the plate 6 and operatively connected to the shaft 2. This pump has a vertical shaft 25 on the top of which is fastened a large gear 26 which meshes with a driving pinion 27 fastened to the shaft 2. Because of this arrangement of gears the speed of the shaft 25 is much less than that of the shaft 2. At the lower end of the shaft 25 is mounted a gear 28 which meshes with another gear 29. The gear 29 is fastened to a shaft 30. Both of the shafts 25 and 30 are supported in the pump casing 31. This casing is fastened to the plate 6 by four bolts 32, and the gears are alined by means of a pin or stud 33 which is screwed in a hole in the bearing 18, and passes through a carefully reamed hole in the casing 31. Lock nuts 34 on the stud keep the casing in a definite vertical position and keep the gears 26 and 27 in correct mesh with each other. The pump casing has vertical holes 35 and 36. The hole 35 communicates with the indentation 37 in the plate 6, and the hole 36 communicates with a passageway 38 in the bearing plate.

With the arrangement of gears, as shown in Figs. 1 to 5 inclusive, the pump operates for a counter-clockwise rotation of the motor shaft 2. In case it is desired to have the pump work for a clockwise rotation of the motor the stud 33 and the bolts 32 are removed, the pump turned through an angle of 180°, and the stud and bolts replaced. The gears are then placed, relative to one another, as seen in Fig. 6.

Before starting the dynamo-electric machine the bearing housing is filled with oil to about the upper surfaces of the gears 28 and 29. The machine is then supplied with electric current so as to make it rotate in the proper direction, which in the case shown in Figs. 1 to 5 is a counter-clockwise rotation of the armature shaft 2. The pinion 27 drives the gear 26 in a clockwise direction, and the gear 28 consequently rotates in the same direction as the gear 26 and drives the gear 29 in the opposite direction, as indicated by the arrows in Figs. 3 and 5. The oil thus fills the indentation 37 and the hole 35, where it is engaged by the teeth of the gears 28 and 29 and is carried thereby around the pump casing to the hole 36. These gears place the oil under pressure and it is forced through a passage which consists of the passage 38, the channel 11 and the vertical channel 10, into the groove 9. The pressure here is exerted against the seat 40 of the sleeve. The flow here divides, part of it escaping into the housing 4 by means of the space about the portion 5 and the space between the legs 41 of the plate 6, and the rest rising in the holes 19. Here the flow again divides and part passes through the holes 20, downward through the vertical grooves 23, lubricating the bearing 18, and escaping through the holes 22 into the housing; the rest flows over the top of the bearing, a small amount splashing upon the gears 26 and 27 and lubricating them. To prevent leakage down the shaft into the dynamo-electric machine from this splashing, I have preferred to cut a groove 42 therein and fill it with babbitt.

What I claim as new and desire to secure by Letters Patent of the United States, is,—

1. In combination with the vertical rotatable shaft of a machine, a sleeve secured thereto, a bearing housing having a projecting portion surrounding the shaft, a fluid pump contained within said housing and operatively connected to said shaft, and a plate resting on said housing, having a surface supporting said sleeve and a passage, said pump being supported upon said plate and communicating with said passage in said plate for delivering lubricating fluid to said supporting surface of the plate.

2. In combination with the vertical rotatable shaft of a machine, a sleeve secured thereto, a bearing housing having a projecting portion surrounding the shaft, a fluid pump operatively connected to said shaft, and a plate resting on said housing having a surface supporting said sleeve, a groove in said supporting surface and a passage, said pump being contained within said bearing housing, supported upon said plate and communicating directly with said passage in said plate for delivering lubricating fluid to said groove.

3. In combination with the vertical rotatable shaft of a machine, a sleeve secured thereto, a bearing having a surface in frictional engagement with said sleeve, a bearing housing having a projecting portion surrounding the shaft, a fluid pump operatively connected to said shaft, and a plate resting on said housing, having a surface supporting said sleeve, a groove in said supporting surface and a passage, said pump being supported upon said plate and communicating directly with said passage in the plate for delivering lubricating fluid to said groove.

4. A machine comprising a frame, a vertical rotatable shaft, a bearing housing supported on said frame and having a projecting portion surrounding said shaft, a sleeve secured to said shaft, a bearing having its surface in frictional engagement with said sleeve, a fluid pump operatively connected to said shaft, and a plate resting on said housing having a surface supporting said sleeve, a groove in said supporting surface and a passage, said pump being supported upon said plate and communicating directly with said passage in the plate for delivering lubricating fluid to said groove.

5. In combination with the vertical rotatable shaft of a machine, a sleeve secured thereto, a bearing housing having a projecting portion surrounding said shaft, a bearing having its surface in frictional engagement with said sleeve, a fluid pump contained within said housing and operatively connected to said shaft, a plate resting on said housing, having a surface supporting said sleeve and a passage for connecting said pump to said supporting surface of the plate.

6. In combination with the vertical rotatable shaft of a machine, a sleeve secured thereto, a nut screwed upon said shaft and taking the upward thrust on said sleeve, a bearing having a surface in frictional engagement with said sleeve, a bearing housing having an opening through which said shaft extends, a fluid pump operatively connected to said shaft, and a plate secured to said housing, having a surface supporting said sleeve, a groove in said supporting surface, and a passage for connecting said pump to said groove.

7. In combination with the vertical rotatable shaft of a machine, a sleeve secured thereto, a nut screwed upon said shaft and taking the upward thrust on said sleeve, a bearing having a surface in frictional engagement with said sleeve, a bearing housing having an opening through which said shaft extends, a fluid pump geared to said shaft, and a plate secured to said housing, having a surface supporting said sleeve and a groove in said supporting surface and a passage, said pump being supported on said plate and communicating directly with said passage in said plate for delivering lubricating fluid to said groove.

8. A machine comprising a frame, a vertical rotatable shaft, a bearing housing supported on said frame and having a projecting portion surrounding said shaft, a sleeve secured to said shaft, a bearing having its surface in frictional engagement with said sleeve, a fluid pump operatively connected to said shaft, and a plate secured to said housing, having a surface supporting said sleeve, a groove in said supporting surface, and a passage for connecting said pump to said groove.

9. In combination with the vertical rotatable shaft of a machine, a sleeve secured thereto, a bearing having a surface in frictional engagement with said sleeve, a bearing housing having an opening through which the shaft extends, a fluid pump operatively connected to said shaft, a plate secured to said housing and having a surface supporting said sleeve, said pump being supported on said plate and communicating directly with a passage therein for delivering lubricating fluid to said supporting surface of the plate, said bearing having horizontal holes at the top thereof and vertical holes communicating with said horizontal holes, whereby lubricating fluid is delivered to said bearing surface between the sleeve and bearing.

10. In combination with the vertical rotatable shaft of a machine, a sleeve secured thereto, a bearing having a babbitted surface in frictional engagement with said sleeve, a bearing housing having an opening through which the shaft extends, a fluid pump operatively connected to said shaft, a plate secured to said housing and having a babbitted surface supporting said sleeve, said pump being supported on said plate and communicating directly with a passage therein for delivering lubricating fluid to said bearing surface of the plate, said bearing having horizontal holes at the top thereof and vertical holes communicating with said horizontal holes whereby lubricating fluid is delivered to said bearing surface between the sleeve and bearing, grooves in the babbitted surface of the bearing, and horizontal holes therein near the bottom for conducting the fluid from said babbitted surface.

In witness whereof, I have hereunto set my hand this 15th day of January, 1908.

HENRY G. REIST.

Witnesses:
BENJAMIN B. HULL,
HELEN ORFORD.